United States Patent
Huang-Fu et al.

(10) Patent No.: US 11,240,699 B2
(45) Date of Patent: Feb. 1, 2022

(54) INSUFFICIENT RESOURCES IN THE UE DURING PDU SESSION ESTABLISHMENT PROCEDURE

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW); Shang-Ru Mo, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 126 days.

(21) Appl. No.: 16/686,868

(22) Filed: Nov. 18, 2019

(65) Prior Publication Data
US 2020/0162958 A1 May 21, 2020

Related U.S. Application Data
(60) Provisional application No. 62/769,021, filed on Nov. 19, 2018.

(51) Int. Cl.
*H04W 28/02* (2009.01)
*H04W 76/10* (2018.01)
(Continued)

(52) U.S. Cl.
CPC ... *H04W 28/0268* (2013.01); *H04W 36/0022* (2013.01); *H04W 36/0044* (2013.01);
(Continued)

(58) Field of Classification Search
CPC ......... H04W 28/0268; H04W 36/0022; H04W 36/0044; H04W 76/10; H04W 88/023;
(Continued)

(56) References Cited

U.S. PATENT DOCUMENTS

| 10,306,580 B1 | 5/2019 | Gupta ................... H04W 8/02 |
| 11,026,127 B2 | 6/2021 | Huang-Fu ............ H04W 76/32 |

(Continued)

FOREIGN PATENT DOCUMENTS

| CN | 1738285 A | 8/2004 |
| CN | 108353310 A | 11/2015 |

(Continued)

OTHER PUBLICATIONS

Taiwan IPO, office action for the TW patent application 108141885 (no English translation is available) dated Dec. 22, 2020 (7 pages).

(Continued)

*Primary Examiner* — Will W Lin
(74) *Attorney, Agent, or Firm* — Imperium Patent Works; Zheng Jin (57) ABSTRACT

A method of handling insufficient resources in a user equipment (UE) during a PDU session establishment procedure is proposed. During a PDU session establishment procedure, UE sends a PDU SESSION ESTABLISHMENT REQUEST message to the network. UE then receives a PDU SESSION ESTABLISHMENT ACCEPT message from the network, the ACCEPT message carries various PDU session parameters including authorized QoS rules and QoS flows. If UE decides to reject the addition of the new authorized QoS flow description or the new authorized QoS rule due to lack of resources, UE may initiate a PDU session release procedure with 5G session management (5GSM) cause IE #26 "insufficient resources". In an alternative embodiment, UE may synchronize with the network by sending a PDU session modification request message to delete certain QoS rules/flow descriptions with 5GSM cause IE #26 "insufficient resources".

12 Claims, 5 Drawing Sheets

(51) Int. Cl.
  *H04W 88/02*   (2009.01)
  *H04W 80/10*   (2009.01)
  *H04W 56/00*   (2009.01)
  *H04W 76/30*   (2018.01)
  *H04W 36/00*   (2009.01)

(52) U.S. Cl.
  CPC ......... *H04W 56/001* (2013.01); *H04W 76/10* (2018.02); *H04W 76/30* (2018.02); *H04W 80/10* (2013.01); *H04W 88/023* (2013.01)

(58) Field of Classification Search
  CPC ... H04W 80/10; H04W 56/001; H04W 76/30; H04W 76/11; H04W 76/20
  See application file for complete search history.

(56) References Cited

U.S. PATENT DOCUMENTS

| | | | | |
|---|---|---|---|---|
| 11,051,224 | B2 | 6/2021 | Jin | H04W 28/0268 |
| 2013/0077503 | A1 | 3/2013 | Chaudhuri et al. | 370/252 |
| 2017/0245184 | A1 | 8/2017 | Shetigar et al. | |
| 2018/0192333 | A1 | 7/2018 | Wu | |
| 2018/0198867 | A1 | 7/2018 | Dao et al. | H04L 29/08 |
| 2018/0324632 | A1 | 11/2018 | Cho et al. | H04W 28/02 |
| 2018/0376445 | A1 | 12/2018 | Yoon et al. | |
| 2019/0124181 | A1 | 4/2019 | Park | H04W 74/0833 |
| 2019/0159157 | A1 | 5/2019 | Gupta | H04W 60/005 |
| 2019/0215724 | A1* | 7/2019 | Talebi Fard | H04L 43/028 |
| 2019/0261449 | A1 | 8/2019 | Kim | H04W 48/16 |
| 2020/0037197 | A1 | 1/2020 | Cho | H04W 28/0263 |
| 2020/0037386 | A1 | 1/2020 | Park | H04W 76/30 |
| 2020/0077315 | A1 | 3/2020 | Jin | H04W 36/14 |
| 2021/0144579 | A1* | 5/2021 | Ke | H04W 28/0263 |
| 2021/0168595 | A1 | 6/2021 | Sun | H04W 12/02 |

FOREIGN PATENT DOCUMENTS

| | | |
|---|---|---|
| CN | 107690161 A | 8/2016 |
| CN | 108702723 A | 11/2016 |
| CN | 108605269 A | 1/2017 |
| CN | 108632917 A | 3/2017 |
| CN | 108370600 A | 5/2017 |
| CN | 108513726 A | 5/2017 |
| CN | 108260162 A | 1/2018 |
| EP | 3637683 A1 | 5/2017 |

OTHER PUBLICATIONS

Taiwan IPO, office action for the TW patent application 108140942 (no English translation is available) dated Jan. 29, 2021 (8 pages).
TR 24.890 V15.1.0 (Mar. 2018), 3rd Generation Partnership Project; technical Specification Group Core Network and Terminals; 5G System—Phase 1; CT WG1 Aspects (Release 15) *sections 6 to 12*.
Taiwan IPO, office action for the TW patent application 108141883 (no English translation is available) dated Aug. 24, 2020 (8 pages).
International Search Report and Written Opinion of International Search Authority for PCT/CN2019/117474 dated Jan. 21, 2020 (9 pages).
TR 24.890 V15.1.0 (Mar. 2018), 3rd Generation Partnership Project; technical Specification Group Core Network and Terminals; 5G System—Phase 1; CT WG1 Aspects (Release 15) *sections 6.7.4, 6.7.5, 9.5, and 9.6*.
International Search Report and Written Opinion of International Search Authority for PCT/CN2019/119452 dated Feb. 10, 2020 (10 pages).
TS 24.501 V15.5.0 (Sep. 2019), Non-Access-Stratum (NAS) protocol for 5G System (5GS): Stage 3 (Release 15) *6.4.1.3 UE-requested PDT session establishment procedure accepted by the network*, *p. 265*.
International Search Report and Written Opinion of International Search Authority for PCT/CN2019/119453 dated Jan. 19, 2020 (9 pages).
USPTO Office Action for related U.S. Appl. No. 16/680,325, dated May 13, 2021.
USPTO Office Action for related U.S. Appl. No. 16/687,166, dated Jul. 8, 2021.

* cited by examiner

INSUFFICIENT RESOURCES IN THE UE DURING PDU SESSION ESTABLISHMENT PROCEDURE

CROSS REFERENCE TO RELATED APPLICATIONS

This application claims priority under 35 U.S.C. § 119 from U.S. Provisional Application No. 62/769,021, entitled "5GSM Congestion Control", filed on Nov. 19, 2018, the subject matter of which is incorporated herein by reference.

TECHNICAL FIELD

The disclosed embodiments relate generally to wireless communication, and, more particularly, to method of handling insufficient resources during PDU session establishment procedure in next generation mobile communication systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G new radio (NR) systems.

In 5G/NR, a Protocol Data Unit (PDU) session defines the association between the UE and the data network that provides a PDU connectivity service. The PDU session establishment is a parallel procedure of PDN connection (bearer) procedure in 4G/LTE. Each PDU session is identified by a PDU session ID (PSI), and may include multiple QoS flows and QoS rules. The network/UE can initiate different PDU session procedures, e.g., PDU session establishment, PDU session modification, and PDU session release. Accordingly, for each PDU session, a UE can be in different 5G session management (5GSM) states during the different PDU session procedures. The different PDU session states include PDU session active state, inactive state, active pending state, inactive pending state, and modification pending state.

In 5G network, QoS flow is the finest granularity for QoS management to enable more flexible QoS control. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow. All types of traffic mapped to the same 5G QoS flow receive the same level of packet forwarding treatment (e.g., scheduling policy, queue management policy, rate shaping policy, RLC configuration etc.) Providing different QoS forwarding treatment requires separate 5G QoS flow. Each QoS flow may include multiple QoS rules consisting of QoS profile, packet filters, and precedence order. QoS profile includes QoS parameters and QoS marking. Packet filter is used for binding a QoS flow to a specific QoS marking. Precedence order represents the priority to adapt a QoS rule to a QoS flow. UE performs the classification and marking of uplink (UL) User Plane traffic, i.e., the association of UL traffic to QoS flows based on QoS rules.

Upon receipt of a PDU SESSION ESTABLISHMENT ACCEPT message from the network, UE may not have sufficient resources to setup the corresponding QoS flow descriptions, QoS rules, or packet filters requested by the network. A solution is sought.

SUMMARY

A method of handling insufficient resources in a user equipment (UE) during a PDU session establishment procedure is proposed. During a PDU session establishment procedure, UE sends a PDU SESSION ESTABLISHMENT REQUEST message to the network. UE then receives a PDU SESSION ESTABLISHMENT ACCEPT message from the network, the ACCEPT message carries various PDU session parameters including authorized QoS rules and QoS flows. If UE decides to reject the addition of the new authorized QoS flow description or the new authorized QoS rule due to lack of resources, UE may initiate a PDU session release procedure with 5G session management (5GSM) cause IE #26 indicating "insufficient resources". In an alternative embodiment, UE may synchronize with the network by sending a PDU session modification request message to delete certain QoS rules/flow descriptions with 5GSM cause IE #26 indicating "insufficient resources".

In one embodiment, a UE transmits a protocol data unit (PDU) session establishment request message to establish a PDU session in a mobile communication network. The UE receives a PDU session establishment accept message from the network, the PDU session establishment accept message carries information of adding new QoS rules and/or new QoS flows associated with the PDU session. The UE determines that it has insufficient resources to support the addition for the new QoS rules and/or the new QoS flows. The UE initiates a PDU session release procedure to release the PDU session upon detecting the insufficient resources.

In another embodiment, a UE transmits a protocol data unit (PDU) session establishment request message to establish a PDU session in a mobile communication network. The UE receives a PDU session establishment accept message from the network, the PDU session establishment accept message carries information of adding new QoS rules and/or new QoS flows associated with the PDU session. The UE determines that the UE has insufficient resources to support the addition for the new QoS rules and/or new QoS flows. The UE synchronizes with the network by sending a 5G session management (SM) cause value indicating the insufficient resources.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
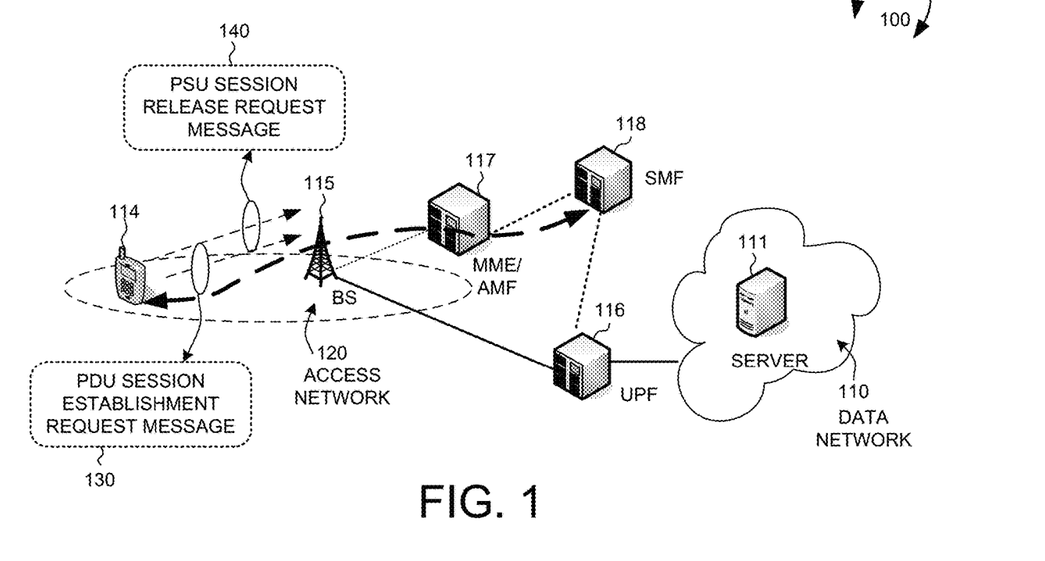
FIG. 1 illustrates an exemplary 5G new radio (NR) network supporting the handling of insufficient resources during PDU session establishment procedure in accordance with one novel aspect.

FIG. 1 illustrates an exemplary 5G new radio (NR) network 100 supporting the handling of insufficient resources during PDU session establishment procedure in accordance with one novel aspect. LTE/NR network 100 comprises data network 110 and application server 111 that provides various services by communicating with a plurality of user equipments (UEs) including UE 114. In the example of FIG. 1, UE 114 and its serving base station BS 115 belong to part of a radio access network RAN 120. RAN 120 provides radio access for UE 114 via a radio access technology (RAT). Application server 111 communicates with UE 114 through User Plane Function (UPF) 116 and BS 115. A mobility management entity (MME) or an access and mobility management function (AMF) 117 communicates with BS 115 for access and mobility management of wireless access devices in LTE/NR network 100. A Session Management Function (SMF) 118 is primarily responsible for interacting with the decoupled data plane, creating, updating and removing Protocol Data Unit (PDU) sessions and managing session context with UPF 116. UE 114 may be equipped with a radio frequency (RF) transceiver or multiple RF transceivers for different application services via different RATs/CNs. UE 114 may be a smart phone, a wearable device, an Internet of Things (IoT) device, and a tablet, etc.

In 5G/NR, a Protocol Data Unit (PDU) session defines the association between the UE and the data network that provides a PDU connectivity service. Each PDU session is identified by a PDU session identity (PSI), and may include multiple QoS flows and QoS rules. The network or the UE can initiate different PDU session procedures, e.g., PDU session establishment, PDU session modification, and PDU session release procedures. In 5G network, QoS flow is the finest granularity for QoS management to enable more flexible QoS control. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow. Each QoS flow may include multiple QoS rules consisting of QoS profile, packet filters, and precedence order.

During a PDU session establishment procedure, UE 114 sends a PDU SESSION ESTABLISHMENT REQUEST message to the network (130). UE 114 then receives a PDU SESSION ESTABLISHMENT ACCEPT message from the network, the ACCEPT message carries various PDU session parameters including authorized QoS rules and QoS flows. However, upon receipt of the PDU SESSION ESTABLISHMENT ACCEPT message, UE 114 may not have sufficient resources to setup the corresponding QoS flow descriptions, QoS rules, and/or packet filters requested by the network. In accordance with one novel aspect, upon receipt of the PDU SESSION ESTABLISHMENT ACCEPT message from the network, if UE 114 decides to reject the addition of the new authorized QoS flow description or the new authorized QoS rule due to lack of resources, UE 114 may initiate a PDU session release procedure with 5G session management (5GSM) cause IE #26 "insufficient resources" (140). In an alternative embodiment, UE 114 may synchronize with the network by sending a PDU session modification request message to delete certain QoS rules/flow descriptions with 5GSM cause IE #26 "insufficient resources".

Figure 2:
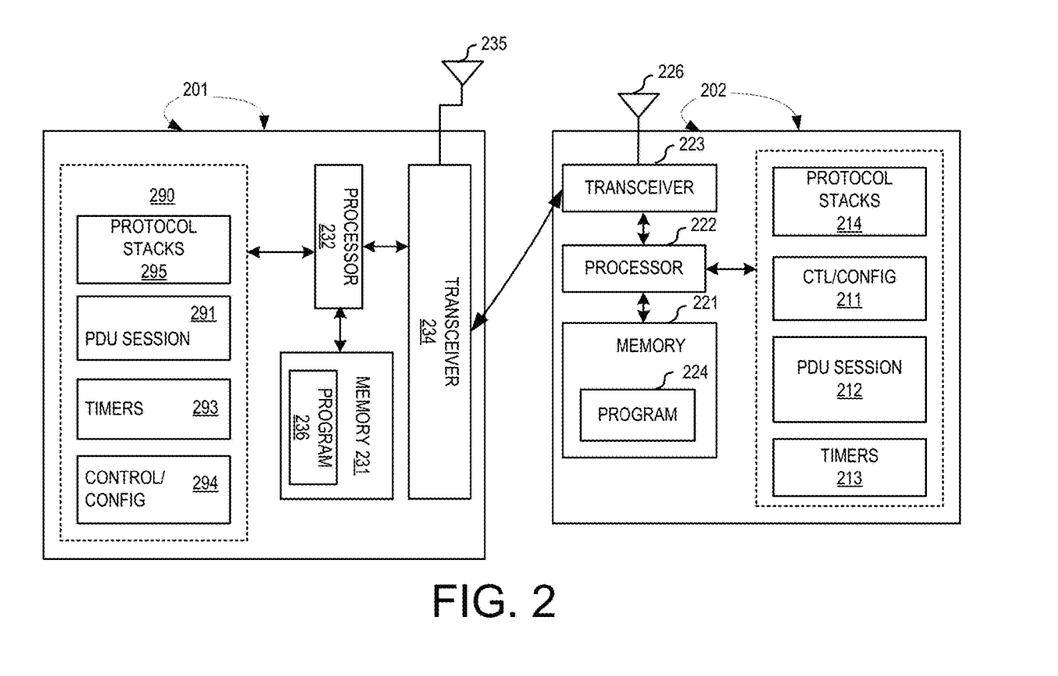
FIG. 2 illustrates simplified block diagrams of a user equipment (UE) and a network entity in accordance with embodiments of the current invention.

FIG. 2 illustrates simplified block diagrams of a user equipment UE 201 and a network entity 202 in accordance with embodiments of the current invention. Network entity (NE) 202 may be a base station (BS), and/or an AMF/SMF. Network entity NE 202 may have an antenna 226, which may transmit and receive radio signals. RF transceiver module 223, coupled with the antenna, may receive RF signals from antenna 226, convert them to baseband signals and send them to processor 222. RF transceiver 223 may also convert received baseband signals from processor 222, convert them to RF signals, and send out to antenna 226. Processor 222 may process the received baseband signals and invoke different functional modules to perform features in NE 202. Memory 221 may store program instructions and data 224 to control the operations of NE 202. NE 202 may also include a set of functional modules and control circuits, such as a control and configuration circuit 211 for providing control and configuration parameters to UE, a PDU session handling circuit 212 for performing different PDU session procedures with UE, and timer(s) 213 for managing timer(s) related to the PDU session procedures.

Similarly, UE 201 has an antenna 235, which may transmit and receive radio signals. RF transceiver module 234, coupled with the antenna, may receive RF signals from antenna 235, convert them to baseband signals and send them to processor 232. RF transceiver 234 may also convert received baseband signals from processor 232, convert them to RF signals, and send out to antenna 235. Processor 232 may process the received baseband signals and invoke different functional modules to perform features in the UE 201. Memory 231 may store program instructions and data 236 to control the operations of the UE 201. UE 201 may also include a set of function modules and control circuits 290 that may carry out functional tasks of the present invention. Protocol stacks 295 comprise Non-Access-Stratum (NAS) layer to communicate with an MME or an AMF/SMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. A PDU session handing circuit 291 performs various PDU session procedures with serving base station, timer(s) 293 manages various timers for the PDU session procedures, and a control and configuration circuit 294 performs control and manages configuration parameters for the UE. In one example, UE 201 initiates a PDU session release procedure to release the PDU session upon detecting the insufficient resources.

The various function modules and control circuits may be implemented and configured by software, firmware, hardware, and combination thereof. The function modules and circuits, when executed by the processors via program instructions contained in the memory, interwork with each other to allow the base station and UE to perform embodiments and functional tasks and features in the network. Each module or circuit may comprise a processor (e.g., 222 or 232) together with corresponding program instructions. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201 and NE 202.

Figure 3:
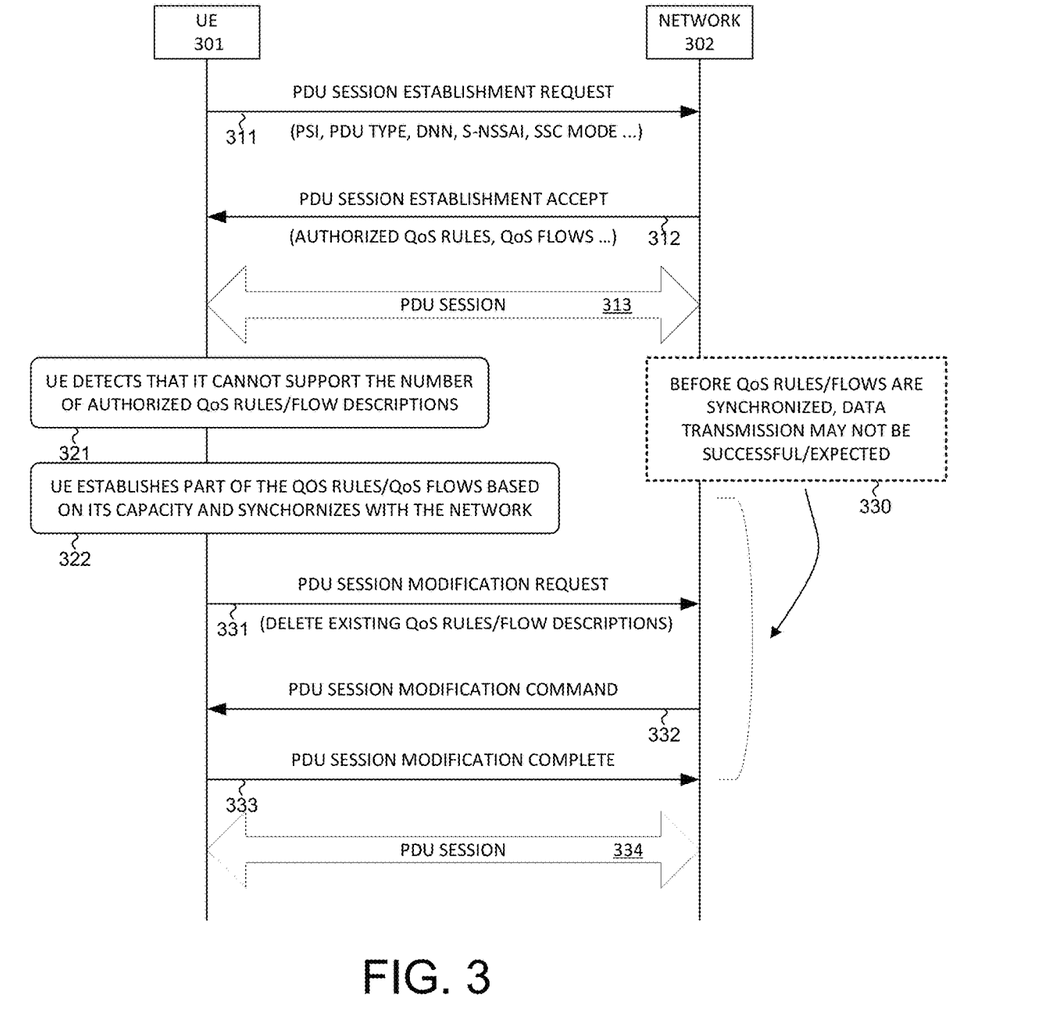
FIG. 3 illustrates an insufficient resource issue in a UE supporting authorized QoS rules/flow descriptions during a PDU session establishment procedure.

FIG. 3 illustrates an insufficient resource issue in a UE supporting authorized QoS rules/flow descriptions during a PDU session establishment procedure. In step 311, UE 301 sends a PDU session establishment request message to network 302 to establish a PDU session, e.g., via NAS signaling (N1 interface). In step 312, network 302 sends a PDU session establishment accept message to UE 301. If the PDU session is successfully established, the UE NAS layer indicates the attributes of the established PDU session (e.g., PDU session ID (PSI), Service and Session Continuity (SSC) mode, Single-Network Slice Selection Assistance Information (S-NSSAI), Data Network Name (DNN), PDU session type, access type, PDU address, etc.) to the URSP handling layer, and provides information (e.g., PDU address) of the established PDU session to the upper layers. In step 313, UE 301 and network 302 communicate over the established PDU session. Note that from 5GSM state machine's point view, upon receipt of a "PDU SESSION ESTABLISHMENT ACCEPT" message, the PDU session moves from active pending state to active state. However, from implementation's point view, there could be two options: 1. The UE doesn't establish the PDU session, but tries to release the PDU session immediately. 2. The UE tries to establish the PDU session with part of the QoS rules/flows.

Each PDU session may include multiple QoS flows and QoS rules. The PDU session establishment accept message carries the instructions for UE to add new authorized QoS rules and/or new authorized QoS flow descriptions (e.g., in step 312). However, UE 301 may not have sufficient resource to support the number of authorized QoS rules and/or QoS flow descriptions. For example, the network can provide a QoS rule IE to the UE, which comprises a list of QoS rules. Each QoS rule comprises a QoS rule identifier (QRI), a length of the QoS rule, a rule operation code, a default QoS rule (DQR) bit, a number of packet filters, a packet filter list, a QoS rule precedence, and a QoS flow identifier (QFI). The network can provide a QoS flow description IE to the UE, which comprises a list of QoS flow descriptions. Each QoS flow description comprises a QFI, a QoS flow operation code, a number of QoS flow parameters, and a QoS flow parameter list. UE 301 needs to store the authorized QoS rules and QoS flow descriptions if they are included in the PDU session establishment accept message for the PDU session. Note the UE resources mainly refer to the memory or predefined capability. For memory, the shortage happens when there is no memory to be allocated to store the new QoS Rules/flow descriptions requested by the network. For predefined capability, the shortage happens when the UE finds that the network requested to establish more QoS rules than the predefined maximum number of QoS rules.

In step 321, UE 301 detects that it cannot support the number of authorized QoS rules and/or QoS flow descriptions. In step 322, UE 301 establishes part of the QoS rules and/or QoS flows based on its capacity, e.g., based on the maximum number of QoS rules and/or QoS flows the UE can support. UE 301 also tries to synchronize PDU session parameters with the network. In step 331, UE 301 sends a PDU session modification request message to network 302 to delete certain QoS rules and/or QoS flow descriptions. Those to-be-deleted QoS rules and/or QoS flow descriptions were authorized by the network but were not added by the UE, and therefore need to be deleted at the network side so that UE remains synchronized with the network in terms of the PDU session parameters. In step 332, UE 301 receives a PDU session modification command message from the network. In step 333, UE 301 sends a PDU session modification complete message to the network. In step 334, UE 301 and network 302 communicate over the modified PDU session. Note that before the PDU session modification procedure is completed, e.g., before the QoS rules and/or QoS flows are synchronized for the PDU session, data transmission and reception may not be successful or expected (330).

Figure 4:
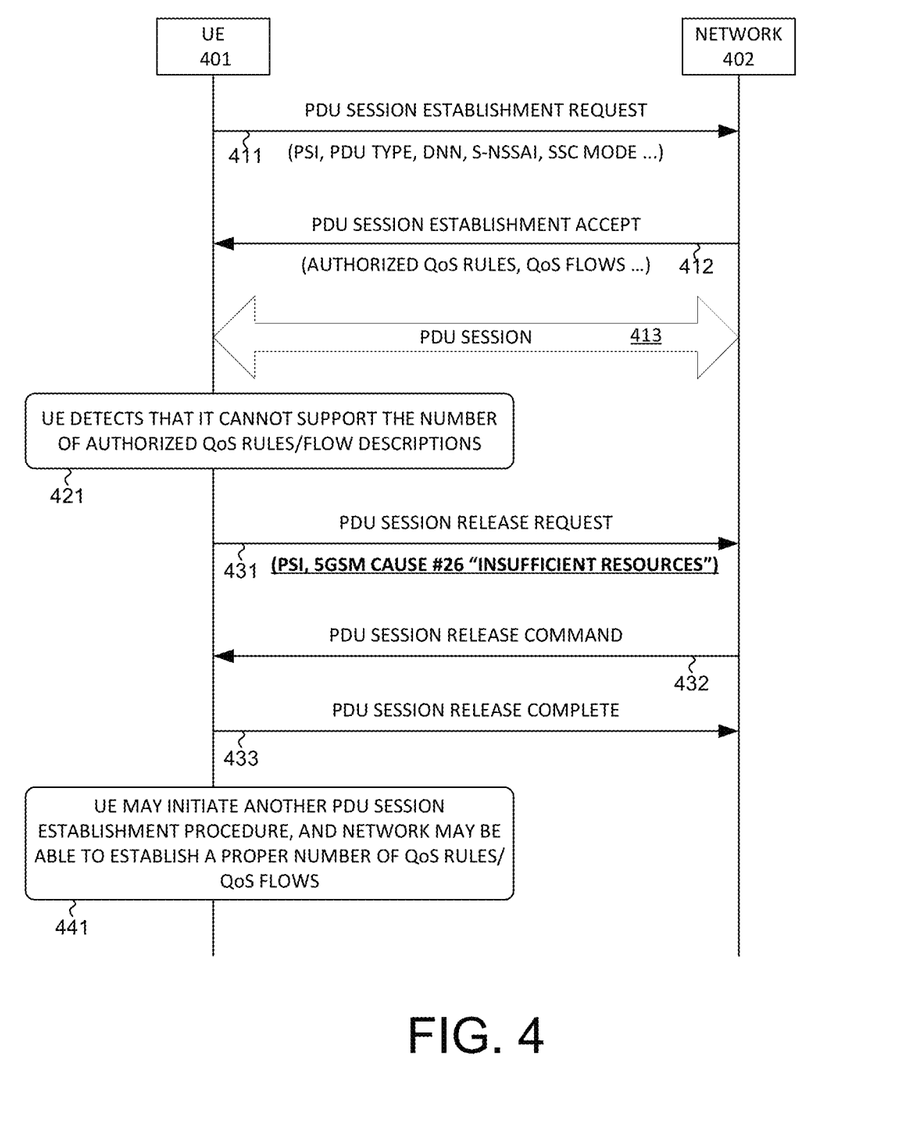
FIG. 4 illustrates a first embodiment of a sequence flow between a UE and a network for handling insufficient resources during a PDU session establishment procedure in accordance with embodiments of the current invention.

FIG. 4 illustrates a first embodiment of a sequence flow between a UE and a network for handling insufficient resources during a PDU session establishment procedure in accordance with embodiments of the current invention. Steps 411, 412, 413, and 421 of FIG. 4 are similar to steps 311, 312, 313, and 321 of FIG. 3, respectively. In the embodiment of FIG. 4, if the number of the authorized QoS rules, the number of packet filters, or the number of the authorized QoS flow descriptions associated with the PDU session have reached the maximum number of supported by the UE upon receipt of the PDU session establishment accept message in step 412, then UE may initiate a PDU session release procedure by sending a PDU session release request message with 5GSM cause #26 "insufficient resources". Note that in this case, UE does not try to establish the PDU session. In step 431, UE 401 sends the PDU session release request message to network 402 to release the PDU session. In addition, the PDU session release request message carries the PSI as well as a 5GSM cause code #26 indicating insufficient resources at the UE side. In step 432, network 402 sends a PDU session release command message to UE 401. In step 433, UE 401 sends a PDU session release complete message to complete the PDU session release procedure. In step 441, UE 401 may initiate another PDU session establishment procedure. Network 402 may be able to establish a proper number of QoS rules and/or QoS flows since the network is aware of the UE resource capability.

Figure 5:
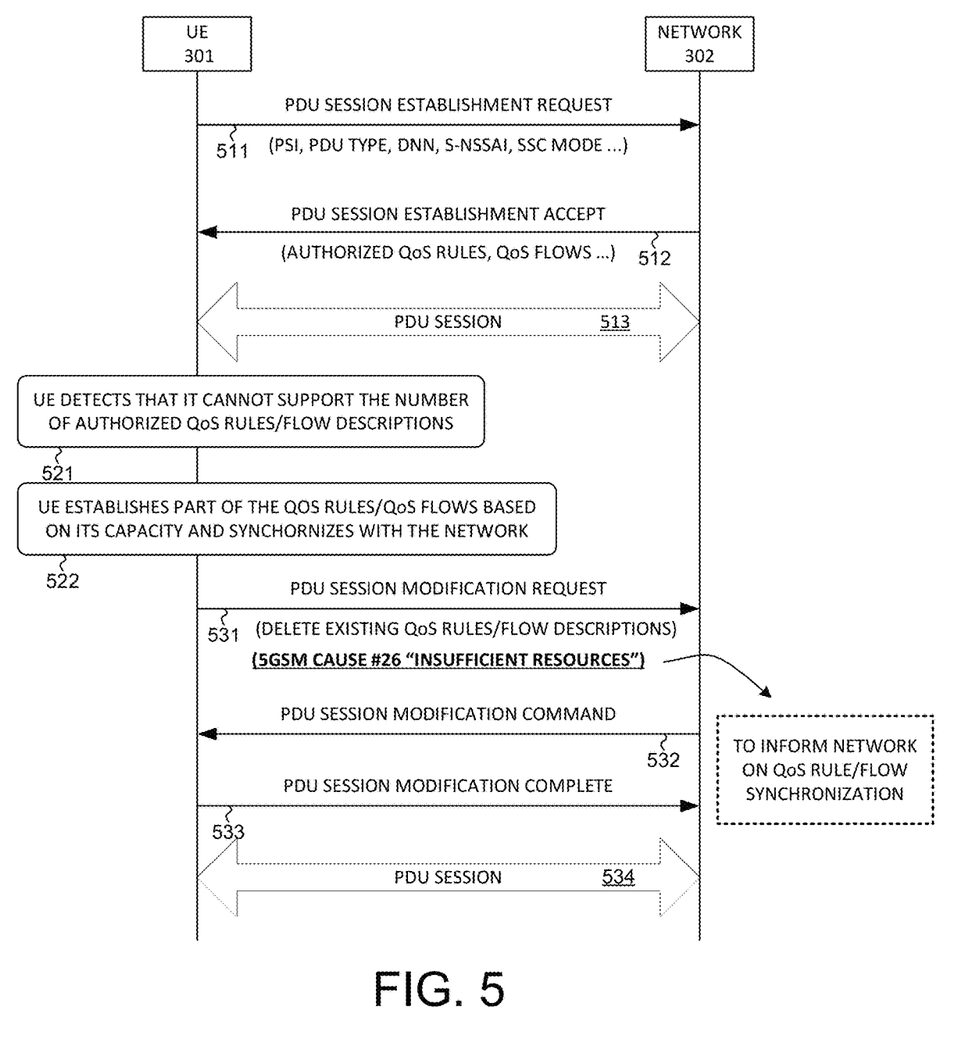
FIG. 5 illustrates a second embodiment of a sequence flow between a UE and a network for handling insufficient resources during a PDU session establishment procedure in accordance with embodiments of the current invention.

FIG. 5 illustrates a second embodiment of a sequence flow between a UE and a network for handling insufficient resources during a PDU session establishment procedure in accordance with embodiments of the current invention. Steps 511, 512, 513, and 521 of FIG. 5 are similar to steps 311, 312, 313, and 321 of FIG. 3, respectively. In the embodiment of FIG. 5, if the number of the authorized QoS rules, the number of packet filters, or the number of the authorized QoS flow descriptions associated with the PDU session have reached the maximum number of supported by the UE upon receipt of the PDU session establishment accept message in step 512, then UE may initiate a PDU session modification procedure to synchronize with the network by sending a PDU session release request message with 5GSM cause #26 "insufficient resources". Note that in this case, UE tries to establish the PDU session with part of the QoS rules and QoS flow descriptions requested by the network.

In step 521, UE 501 detects that it cannot support the number of authorized QoS rules and/or QoS flow descriptions. In step 522, UE 501 establishes part of the QoS rules and/or QoS flows based on its capacity, e.g., based on the maximum number of QoS rules and/or QoS flows the UE can support. UE 501 also tries to synchronize PDU session parameters with the network. In step 531, UE 501 sends a PDU session modification request message to network 502 to delete certain QoS rules and/or QoS flow descriptions. Those to-be-deleted QoS rules and/or QoS flow descriptions were authorized by the network but were not added by the UE, and therefore need to be deleted at the network side so that UE remains synchronized with the network in terms of the PDU session parameters. Accordingly, the PDU session modification request message further carries a 5GSM cause code #26 indicating insufficient resources at the UE side to inform the network on QoS rule/flow synchronization. In step 532, UE 501 receives a PDU session modification command message from the network. In step 533, UE 501 sends a PDU session modification complete message to the network. In step 534, UE 501 and network 502 communicate over the modified PDU session.

Figure 6:
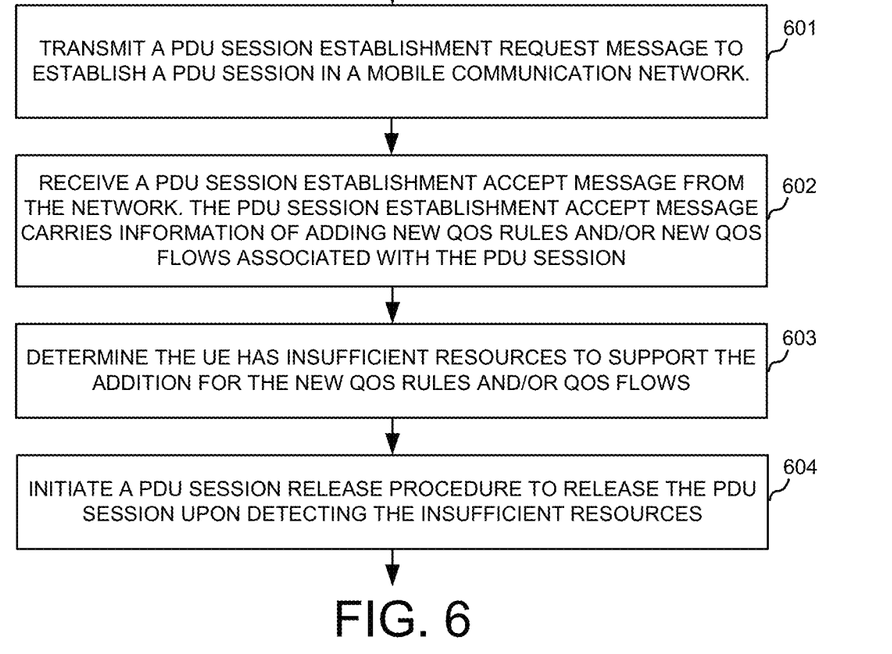
FIG. 6 is a flow chart of a method of handling insufficient resources during a PDU session establishment procedure by releasing the PDU session with cause code in accordance with a novel aspect.

FIG. 6 is a flow chart of a method of handling insufficient resources during a PDU session establishment procedure by releasing the PDU session with cause code in accordance with a novel aspect. In step 601, a UE transmits a protocol data unit (PDU) session establishment request message to establish a PDU session in a mobile communication network. In step 602, the UE receives a PDU session establishment accept message from the network, the PDU session establishment accept message carries information of adding new QoS rules and/or new QoS flows associated with the PDU session. In step 603, the UE determines that it has insufficient resources to support the addition for the new QoS rules and/or the new QoS flows. In step 604, the UE initiates a PDU session release procedure to release the PDU session upon detecting the insufficient resources.

Figure 7:
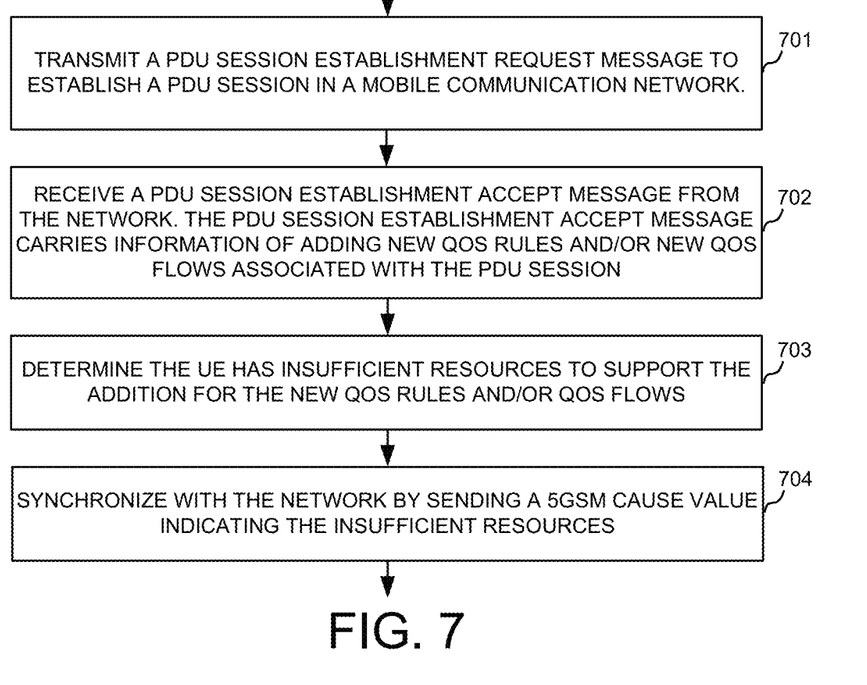
FIG. 7 is a flow chart of a method of handling insufficient resources during a PDU session establishment procedure by modifying the PDU session with cause code in accordance with a novel aspect.

FIG. 7 is a flow chart of a method of handling insufficient resources during a PDU session establishment procedure by modifying the PDU session with cause code in accordance with a novel aspect. In step 701, a UE transmits a protocol data unit (PDU) session establishment request message to establish a PDU session in a mobile communication network. In step 702, the UE receives a PDU session establishment accept message from the network, the PDU session establishment accept message carries information of adding new QoS rules and/or new QoS flows associated with the PDU session. In step 703, the UE determines that the UE has insufficient resources to support the addition for the new QoS rules and/or new QoS flows. In step 704, the UE synchronizes with the network by sending a 5G session management (SM) cause value indicating the insufficient resources.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   transmitting a protocol data unit (PDU) session establishment request message by a user equipment (UE) to establish a PDU session in a mobile communication network;
   receiving a PDU session establishment accept message from the network, wherein the PDU session establishment accept message carries at least one of parameters including a number of QoS rules, a number of packet filters, and a number of QoS flow descriptions for adding at least one of new QoS rules and new QoS flows associated with the PDU session;
   determining that the UE has insufficient resources to support the addition for the at least one of the new QoS rules and/or the new QoS flows, wherein the UE determines that the UE has insufficient resources to store the number of QoS rules, the number of packet filters, or the number of QoS flow descriptions; and
   initiating a PDU session release procedure to release the PDU session upon detecting the insufficient resources.

2. The method of claim 1, wherein the UE transmits a PDU session release request to release the PDU session, and wherein the PDU session release request message carries a 5G session management (5GSM) cause value indicating the insufficient resources.

3. The method of claim 2, wherein the 5GSM cause value is #26 for insufficient resources.

4. The method of claim 1, further comprising:
   transmitting another PDU session establishment request message to the network, wherein the UE is able to support QoS rules and/or QoS flows authorized by the network.

5. A User Equipment (UE), comprising:
   a transmitter that transmits a protocol data unit (PDU) session establishment request message by the UE to establish a PDU session in a mobile communication network;
   a receiver that receives a PDU session establishment accept message from the network, wherein the PDU session establishment accept message carries at least one of parameters including a number of QoS rules, a number of packet filters, and a number of QoS flow descriptions for adding at least one of new QoS rules and new QoS flows associated with the PDU session;
   a control circuit that determines that the UE has insufficient resources to support the addition for the at least one of the new QoS rules and/or the new QoS flows, wherein the UE determines that the UE has insufficient resources to store the number of QoS rules, the number of packet filters, or the number of QoS flow descriptions; and
   a PDU session handling circuit that initiates a PDU session release procedure to release the PDU session upon detecting the insufficient resources.

6. The UE of claim 5, wherein the UE transmits a PDU session release request to release the PDU session, and wherein the PDU session release request message carries a 5G session management (5GSM) cause value indicating the insufficient resources.

7. The UE of claim 6, wherein the 5GSM cause value is #26 for insufficient resources.

8. The UE of claim 5, further comprising:
transmitting another PDU session establishment request message to the network, wherein the UE is able to support QoS rules and/or QoS flows authorized by the network.

9. A method, comprising:
transmitting a protocol data unit (PDU) session establishment request message by a user equipment (UE) to establish a PDU session in a mobile communication network;
receiving a PDU session establishment accept message from the network, wherein the PDU session establishment accept message carries at least one of parameters including a number of QoS rules, a number of packet filters, and a number of QoS flow descriptions for adding at least one of new QoS rules and new QoS flows associated with the PDU session;
determining that the UE has insufficient resources to support the addition for the at least one the new QoS rules and new QoS flows, wherein the UE determines that the UE has insufficient resources to store the number of QoS rules, the number of packet filters, or the number of QoS flow descriptions; and
synchronizing with the network by sending a 5G session management (SM) cause value indicating the insufficient resources.

10. The method of claim 9, wherein the UE establishes the PDU session with a first part of QoS rules and/or QoS flows in accordance with UE capacity.

11. The method of claim 9, wherein the UE synchronizes with the network by sending a PDU session modification request message to the network to delete a second part of QoS rules and/or QoS flows.

12. The method of claim 11, wherein the PDU session modification request message carries the 5GSM cause value of the insufficient resources.

* * * * *